Aug. 29, 1950

F. C. ISELY 2,520,147

TUNABLE RADIO FREQUENCY CIRCUITS

Filed June 29, 1948

INVENTOR.
FRANK C. ISELY

BY

ATTORNEY

Patented Aug. 29, 1950

2,520,147

UNITED STATES PATENT OFFICE

2,520,147

TUNABLE RADIO FREQUENCY CIRCUITS

Frank C. Isely, Washington, D. C.

Application June 29, 1948, Serial No. 35,959

8 Claims. (Cl. 178—44)

(Granted under the act of March 3, 1883, as amended April 30, 1928; 370 O. G. 757)

The present invention relates to radio frequency circuits of the distributed constant type, and is in particular concerned with the problem of providing an extended tuning ratio for radio frequency circuits operating above 300 megacycles.

Heretofore, a majority of the tunable line controlled radio frequency circuits (distributed constant circuits) have been tuned by varying the physical length of the line. Such tuning methods often require complicated frequency adjusting apparatus which adds both to the physical bulk of the circuit and to the cost of manufacture thereof. Furthermore, such distributed constant circuits that have thus far been provided by the prior art are of such construction that they are not readily adaptable to installations which require ganged or synchronous control of two or more distributed constant circuits.

It is accordingly an object of this invention to provide a distributed constant circuit which readily lends itself to ganged operation with other similar circuits.

It is another object of this invention to provide a distributed constant radio frequency circuit wherein tuning is accomplished by uniformly varying the distributed constants of the circuit.

It is another object of this invention to construct a simple, inexpensive distributed constant circuit offering exceptionally wide range tuning at frequencies above 300 megacycles.

It is still another object of this invention to provide a tunable two conductor radio frequency circuit wherein tuning is accomplished by the rotation of one of the conductors relative to the other.

Figures 1, 1A:
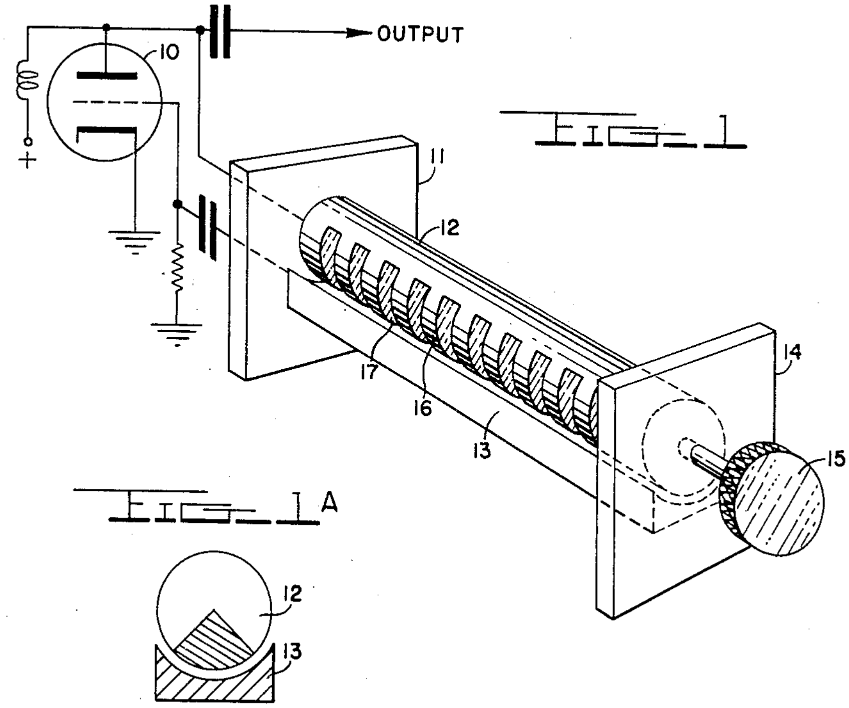

Other objects and features of the present invention will become apparent upon a careful consideration of the following detailed description when taken together with the accompanying drawings, in which:

Fig. 1 is a partial perspective view showing my invention as applied to a two wire line oscillator.

Fig. 1*a* is a cross-sectional view of the two wire line illustrated in Fig. 1.

Figure 2A:
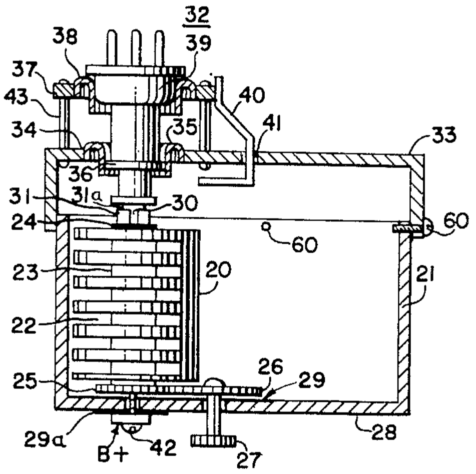
Figure 2:
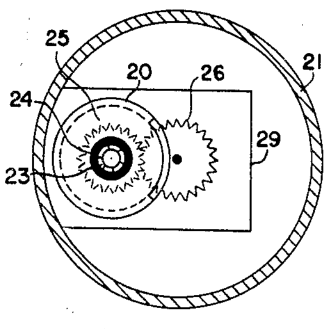

Figs. 2 and 2*a* show in top elevation and cross-section respectively, an alternate embodiment of my invention.

Figure 3:
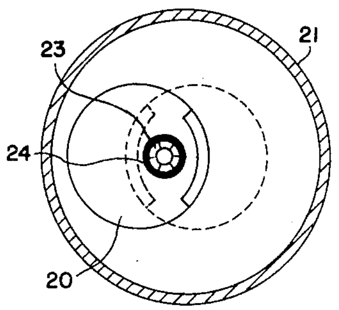

Fig. 3 is a simplified top elevational view of still another embodiment of my invention.

Referring now to Figs. 1 and 1*a* there is illustrated the novel concepts of my invention as applied to one form of line controlled oscillator. This embodiment comprises a single triode vacuum tube component 10 and a two wire line comprising conductors 12 and 13. In accordance with the teachings of this embodiment of the invention, conductors 12 and 13 are supported at one end in a suitable insulating block 11 with the spacing between conductors made as small as practical. Conductor 12 is then connected through a conventional sliding contact, not illustrated, to the anode of tube 10. Conductor 13 is directly connected through a suitable resistance capacitance network to the grid of tube 10.

To obtain quarter wave resonance, the ends of conductors 12 and 13 remote from tube 10 are shorted in a suitable metallic end plate 14. Alternatively, if half wave resonance is utilized, end plate 14 is made of insulating material. In either event the line formed by conductors 12 and 13 comprises a grid-anode tank circuit, suitably dimensioned to produce oscillations. In practice, conductors 12 and 13 are cut to an integral number of quarter wavelengths long at the highest frequency of operation.

For tuning reasons conductor 12 is rotatably journalled in end plates 11 and 14 with knurled knob 15 being provided to permit manual rotation of conductor 12.

For ease in construction, conductor 12 is preferably, but not necessarily, made from solid cylindrical tubing transversely slotted at uniformly spaced intervals along its length. Conductor 13 is preferably made of rectangular stock with the face thereof adjacent conductor 12 milled to provide a concave surface.

This construction provides a line wherein the distributed capacitance between the conductors 12 and 13 is constant with rotation of conductor 12, but the distributed inductance is variable with rotation of the conductor 12. This characteristic arises by virtue of the fact that the fringe capacity between the teeth 16 of the slotted portion of conductor 12 and conductor 13 is essentially equal to the distributed capacity between the solid portion of conductor 12 and conductor 13. Thus the distributed capacity of the line will remain the same with rotation of conductor 12.

The mutual inductance between conductors 12 and 13, however, varies with the spacing between the solid portion of conductor 12 and conductor 13. Accordingly, as conductor 12 is rotated the distributed capacity between conductors remains constant while the mutual inductance between these conductors varies, it being a maximum in the position illustrated in Fig. 1*a*. In this condition, the resonant frequency of the line section is at a maximum. Rotation of conductor 12

180° minimizes the mutual inductance and also the resonant frequency of the line section.

The width of the slots 16 and the spacing 17 therebetween is arbitrarily determined. In one embodiment $\frac{1}{16}''$ slots with $\frac{1}{16}''$ spacing gave a tuning range of nearly two to one. $\frac{1}{32}''$ slots with $\frac{1}{8}''$ spacing was also found to give a tuning range of substantially two to one. Similarly, the angle of the solid portion of conductor 12 is not critical and can be varied within wide latitudes without impairing the operation and performance of the circuit. This angle is only important in that it determines the value of self inductance of conductor 12. The greater the angle, the smaller the self inductance and the higher the resonant frequency. The angle of the solid portion is shown in Fig. 1*a* as being approximately 90°.

Referring now to Figs. 2 and 2*a* there is shown the teachings of my invention as applied to a modified concentric transmission line comprising inner and outer conductors 20 and 21. The inner conductor is made rotatable and uniformly slotted at 22 for the same reasons as mentioned above.

In this application the inner conductor 20 is hollow, and is provided with an integral reentrant sleeve 23 for positioning over a center post 31. Spatially separating center post 31 and reentrant sleeve 23 is a fiber washer 24. Washer 24 as well as the air dielectric between post 31 and sleeve 23 operate to provide a capacitive radio frequency connection between the center post and the inner conductor 20. Post 31 is off-set from the axis of the outer cylinder 21 sufficiently to permit a good capacitive association between the inner conductor 20 and the inner walls of the outer cylinder 21.

A gear wheel 25 is securely attached to the lower end of the inner conductor 20 for engagement with a fiber spur gear 26. Spur gear 26 is pinned or otherwise attached to a knurled knob 27 that projects from end wall 28 of the outer cylinder 21. Rotation of knob 27 produces rotation of the inner conductor 20 and therefore tuning of the line. Insulatingly separating the gears 25 and 26 from the end wall 28 is a strip of mica insulation 29. The mica 29 coacts with the end wall 28 and the lower end of cylinder 20 to provide a capacitive short circuit between the ends of the inner and outer conductors. This line thus provides for quarter wave resonance.

The upper end of the center post 31 is longitudinally slotted at 30 to provide a finger like contact engagement with the plate cap 31A of a "light house" tube 32. The lower end of the center post is anchored to end plate 28 through screw 42, which also serves as a connection for a source of plate supply potential for tube 32. A second strip of mica 29*a* is used to insulate the B+ terminal 42 from the outer end wall 28 of the outer cylinder 21. The upper end of the concentric line is closed by a cup-shaped end cap 33 held to the outer cylinder 21 by screws 60 and apertured at 34 to permit entry of tube 32 into the line. Attached to the inner periphery of aperture 34 is a flexible annular contact ring 35 adapted to contact the grid ring 36 of tube 32 thereby to provide grounded grid operation of the tube.

Surrounding the cathode ring terminal 39 of tube 32 is an annular support 37 held in position by a plurality of stand-off insulators 43. Attached to the ring support 37 is a flexible annular contact ring 38 adapted to provide contact with the cathode ring 39 of tube 32.

To provide regenerative feedback for the production of oscillations, a metal capacitative feedback strap 40 is attached to the cathode support ring 37 and lead down through an aperture 41 cut in cap 33 to capacitatively engage the anode of tube 32.

Again in this embodiment as in the previous embodiment the distributed capacitance between the inner conductor 20 and the outer conductor 21 remains constant with rotation of the former. The mutual inductance between these conductors, however, varies with rotation of the inner conductor. In this embodiment the mutual inductance is at a minimum when the solid portion of the slotted inner conductor occupies the position illustrated in Fig. 2. With this setting of the inner conductor, the resonant frequency is at a minimum. Rotation of the inner conductor 180° increases the resonant frequency to a maximum.

Again, the width and spacing of the slots 22 are not critical. Those proportions previously used in the description of Fig. 1 may be used to equal advantage in this embodiment. Likewise, the diameter of the outer and inner conductors is not critical. The diameter of the outer cylinder is preferably something less than a half wavelength at the highest frequency of operation. The diameter of the inner conductor is arbitrarily determined preferably at any value less than one-half the diameter of the outer conductor.

An embodiment of the present invention wherein the distributed inductance is held constant and the distributed capacitance is varied is illustrated in simplified form in Fig. 3. This embodiment is constructionally identical to that illustrated in Fig. 2 with the exception that the inner conductor 20 is rotated off-axis. In this embodiment, the mutual inductance between the solid portion of the inner conductor 20 and the outer conductor 21 remains substantially constant with rotation, whereas the distributed capacity varies with rotation, it being a maximum when the inner conductor is in position illustrated by the solid lines and a minimum when the inner conductor is in the position illustrated by the dotted lines. The constant mutual inductance characteristic comes about by reason of the fact that the solid, or inductive part, of the inner conductor remains almost equi-distance from the inner surface of the outer conductor 21 with rotation of the inner conductor 20.

From the foregoing it becomes apparent that I have provided a distributed constant circuit which is of simple and inexpensive construction and which is easily tunable by a simple rotative motion. An obvious advantage accruing from this form of tuning lies in the ability of the circuit to be ganged to other similar circuits by means of conventional gearing mechanisms. It is further apparent from the foregoing that numerous modifications, other than those herein illustrated, may be made of the present invention without exceeding the spirit thereof. Accordingly it must be understood that this invention is not to be limited except as defined by the appended claims.

The invention described herein may be manufactured and used by or for the Government of the United States of America for governmental purposes without the payment of any royalties thereon or therefor.

What is claimed is:

1. A tunable distributed constant radio frequency circuit comprising a pair of substantially coextensive conductors disposed in mutual parallelism, one of said conductors being rotatable relative to the other about an axis parallel to said other, said one of said conductors further being provided with a series of transverse slots extending partially around the surface thereof.

2. A tunable distributed constant radio frequency circuit comprising a pair of substantially coextensive conductors disposed in mutual parallelism, each of said conductors being an integral number of electrical quarter wavelengths long at the highest frequency of operation of the circuit, one of said conductors being rotatable relative to the other about an axis parallel to said other, said one of said conductors further being provided with a series of transverse slots extending partially around the surface thereof.

3. A tunable distributed constant radio frequency circuit comprising a pair of substantially coextensive conductors disposed in mutual parallelism, one of said conductors being rotatable relative to the other about an axis parallel to said other, said one of said conductors further being provided with a series of transverse slots of uniform width and spacing formed over the length thereof, said slots extending only partially around the surface of said one conductor.

4. A tunable distributed constant radio frequency circuit comprising a pair of substantially coextensive conductors disposed in mutual parallelism, each of said conductors being an integral number of electrical quarter wavelengths long at the highest frequency of operation of the circuit, one of said conductors being rotatable relative to the other about an axis parallel to said other, said one of said conductors further being provided with a series of transverse slots of uniform width and spacing formed over the length thereof, said slots extending only partially around the surface of said one conductor.

5. A tunable distributed constant radio frequency circuit comprising a pair of cylindrical conductors of different diameters, the smaller conductor being disposed within the other and substantially coextensive therewith, thereby forming an assembly comprising inner and outer conductors, said inner conductor being rotatable relative to the other about an axis parallel to said outer conductor, said inner conductor being further provided with a series of transverse slots extending partially around the surface thereof.

6. A tunable distributed constant radio frequency circuit comprising a pair of cylindrical conductors of different diameters, the smaller conductor being disposed within the other and substantially coextensive therewith, thereby forming an assembly comprising inner and outer conductors, said inner conductor being disposed off-axis from said outer conductor and rotatable about an axis which passes therethrough, said inner conductor being further provided with a series of transverse slots extending partially around the surface thereof.

7. A tunable distributed constant radio frequency circuit comprising a pair of cylindrical conductors of different diameters, the smaller conductor being disposed within the other and substantially coextensive therewith, thereby forming an assembly comprising inner and outer conductors, said inner conductor being disposed off-axis from said outer conductor and rotatable about an axis which passes therethrough, said inner conductor being further provided with a series of transverse slots of uniform width and spacing formed therein, said slots extending only partially around the surface of said inner conductor.

8. A tunable distributed constant radio frequency circuit comprising a pair of cylindrical conductors of different diameters, the smaller conductor being disposed within the other and substantially coextensive therewith, each of said conductors being an integral member of electrical wavelengths long at the highest frequency of operation of the circuit, the inner conductor being disposed off-axis from the outer conductor and rotatable about an axis which passes therethrough, said inner conductor being further provided with a series of transverse slots of uniform width and spacing formed therein, said slots extending only partially around the surface of said inner conductor.

FRANK C. ISELY.

REFERENCES CITED

The following references are of record in the file of this patent:

UNITED STATES PATENTS

| Number | Name | Date |
|---|---|---|
| 1,610,122 | Edenburg --------- | Dec. 7, 1926 |